United States Patent [19]

Sargent et al.

[11] Patent Number: 4,779,650
[45] Date of Patent: Oct. 25, 1988

[54] TELESCOPING DRAIN ASSEMBLY FOR RECREATIONAL VEHICLES

[75] Inventors: Charles L. Sargent; John M. Antos, both of Ann Arbor; George Grech, Garden City, all of Mich.

[73] Assignee: Thetford Corporation, Ann Arbor, Mich.

[21] Appl. No.: 114,083

[22] Filed: Oct. 27, 1987

[51] Int. Cl.$^4$ .............................................. E21B 43/24
[52] U.S. Cl. .................................. 137/899; 137/599.2; 137/615; 285/165; 285/302
[58] Field of Search ...................... 137/615, 899, 599.2; 251/299, 298; 285/165, 299, 302

[56] References Cited

U.S. PATENT DOCUMENTS

| | | | |
|---|---|---|---|
| 2,140,734 | 12/1938 | Chandler | 137/599.2 |
| 3,496,959 | 2/1970 | Wolfe et al. | 137/899 |
| 3,623,500 | 11/1971 | Hoy | 137/899 |
| 3,811,462 | 5/1974 | Feliz | 137/899 |
| 4,133,347 | 1/1979 | Mercer | 137/899 |
| 4,223,702 | 9/1980 | Cook | 137/899 |
| 4,399,976 | 8/1983 | Legris | 251/315 |
| 4,570,673 | 2/1986 | Kendrick et al. | 137/615 |

Primary Examiner—A. Michael Chambers
Attorney, Agent, or Firm—Harness, Dickey & Pierce

[57] ABSTRACT

A rotatable telescoping drain assembly permanently mounted at the end to waste receptacle drain on the underside of a recreational vehicle consisting of a swivel coupling unit attached to an axially extensible flow hose within a telescoping support tube assembly, a tie rod assembly connected to and extending between the tube assembly and the swivel coupling unit, and a discharge spout unit connected to the other end of the telescoping support tube and flow hose assembly which includes an internal valve. The telescoping tube assembly can be relatively telescoped, the swivel coupling relatively swiveled, and the tie rod relatively pivoted to locate the spout into the inlet of appropriate waste storage facility. During travel of the vehicle the discharge spout and drain assembly is supported within an enclosed cabinet mounted on the vehicle. The telescoping drain assembly allows the vehicle operator to conveniently avoid the usual mess associated with emptying liquid waste receptacles on the vehicle.

10 Claims, 5 Drawing Sheets

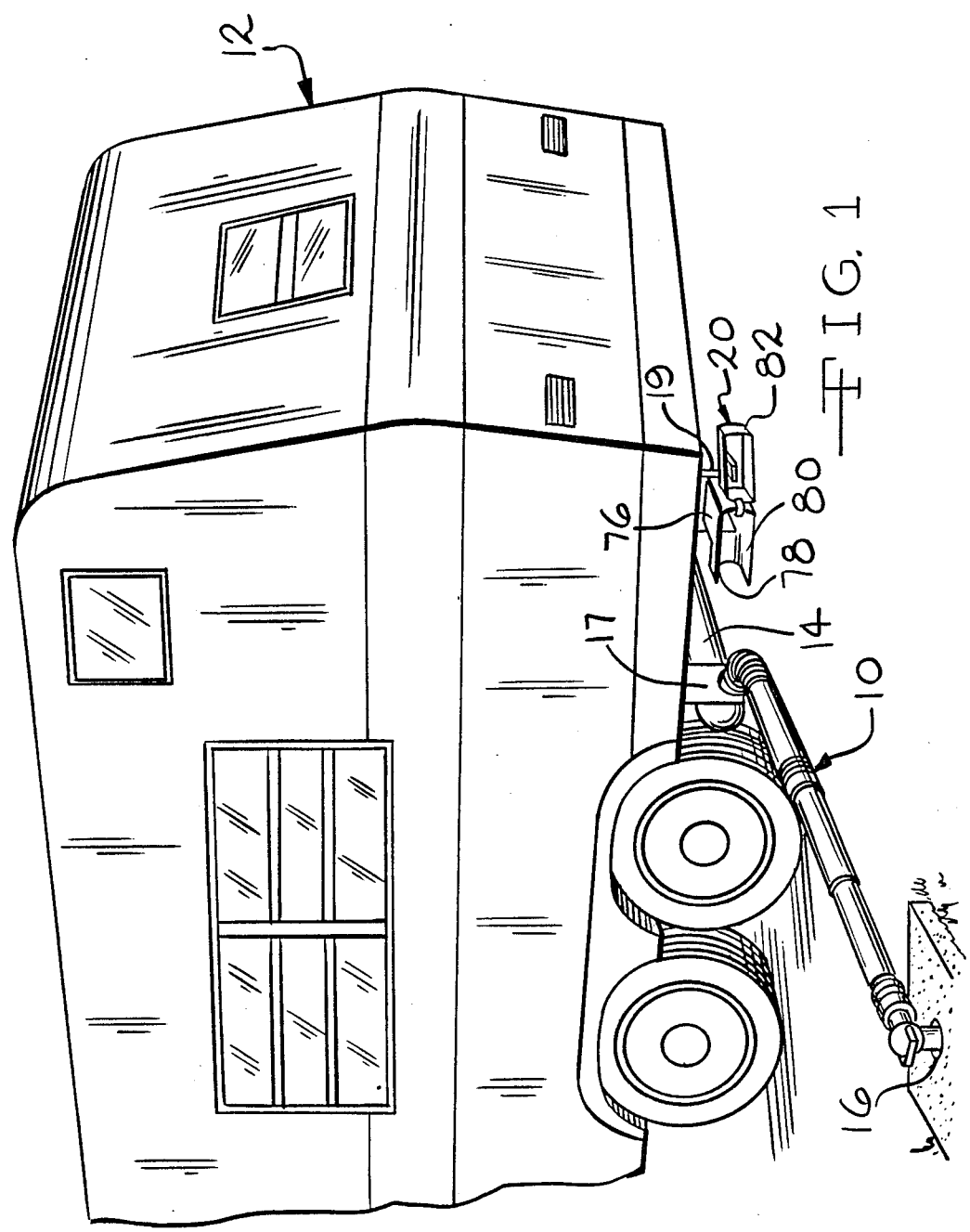

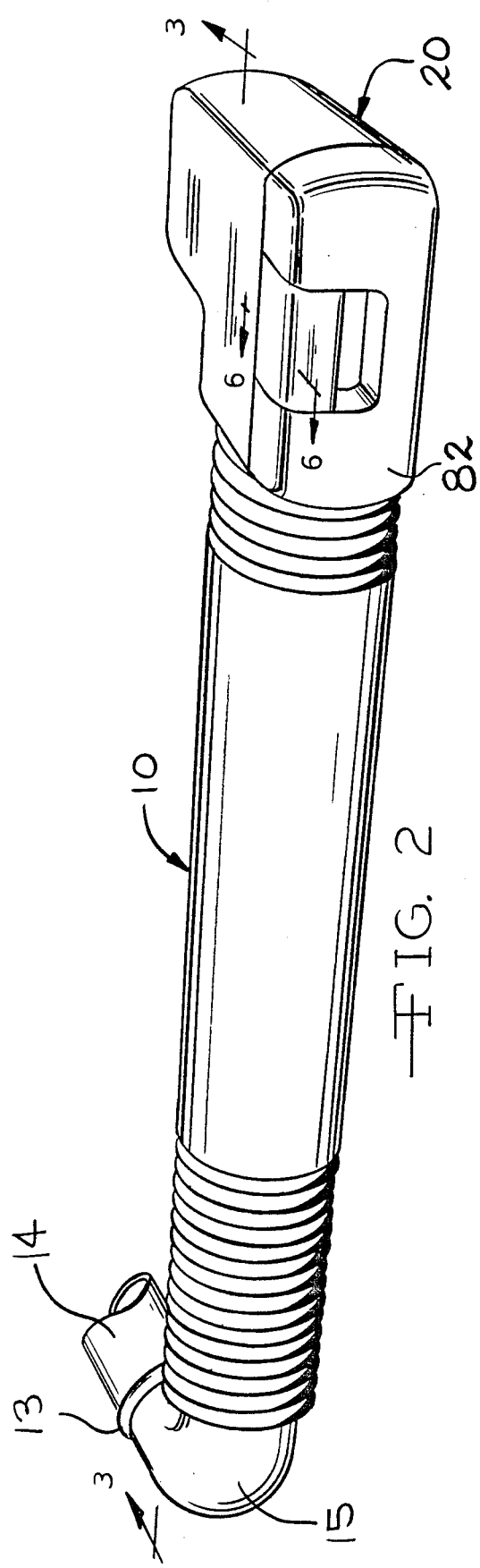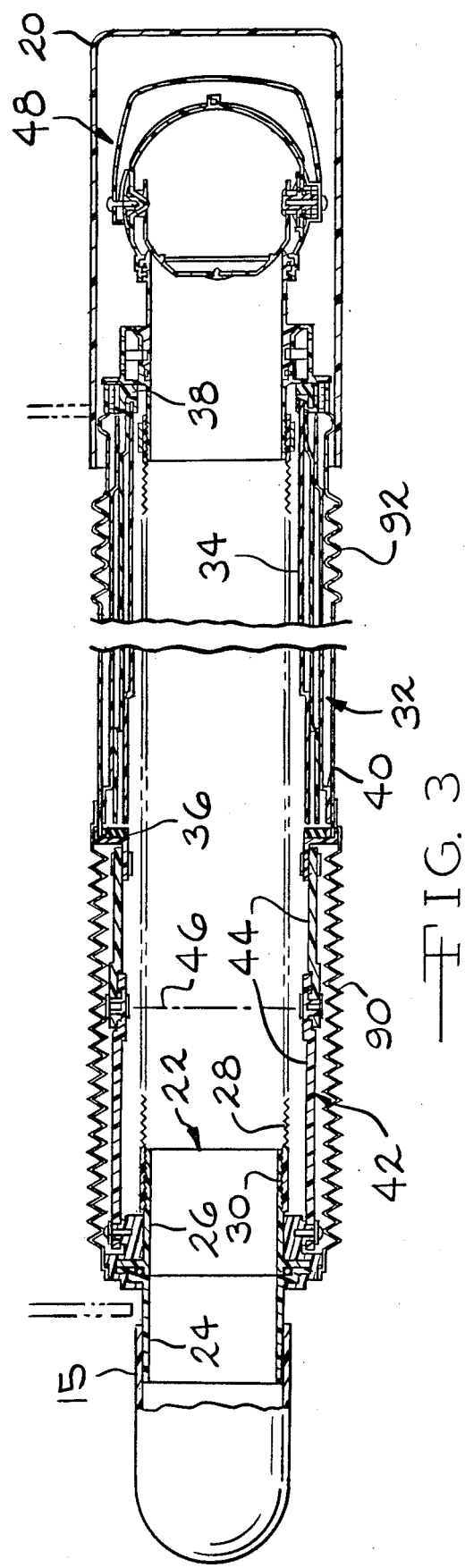

TELESCOPING DRAIN ASSEMBLY FOR RECREATIONAL VEHICLES

BACKGROUND OF THE INVENTION

This invention relates generally to recreational vehicles and more particularly to a telescoping drain assembly permanently mounted on the vehicle and usable for discharging liquid waste from the vehicle to a suitable storage location such as an underground tank.

Present day recreational vehicles that include collection tanks for waste water and sewage are in wide use. Periodically, such tanks must be emptied. Only rudimentary removal mechanisms are provided for emptying the waste from recreational vehicles. Examples are flexible hoses that are stored in an external cabinet on the vehicle and which must be connected to the discharge pipe on the vehicle and then manipulated to connect to an underground storage tank or the like. These hoses necessarily involve human handling of the waste material both during connection of the hose to the vehicle and in storage of the hose following use to drain the vehicle tanks since some of the waste clings to the hose. In addition, connection or disconnection of the mechanisms often involves crawling around the vehicle on typically soiled pavement near the underground storage tank inlet. As a result, present day systems for removing the stored liquid waste from recreational vehicles are very unsatisfactory.

It is an object of the present invention, therefore, to provide a telescoping drain assembly that enables removal of this waste without the previously unavoidable mess and inconvenience that this entailed for the vehicle operator.

SUMMARY OF THE INVENTION

The present invention consists of a swivel coupling unit comprised of a pair of axially aligned tubes that are relatively rotatable. One of the tubes is connected to the waste water discharge pipe on the vehicle. An axially extensible flow hose of flexible construction is connected at one end to the other one of the tubes. A telescoping support tube assembly having a pair of ends and comprising a plurality of axially telescoped tubes is positioned about the flow hose at a position spaced from the coupling unit so as to protect the flexible flow hose and provide a proper grade for drainage. A tie rod assembly connected to and extending between one end of the tube assembly and the coupling unit comprises tie rod members pivotally connected for pivotal movement about an axis extending transversely through the flow tube.

A discharge spout unit connected to the other end of the telescoping support tube and flow hose assembly includes a valve member moveable between open and closed positions. As a result the telescoping support tube assembly can be relatively telescoped to locate the spout a desired distance from the vehicle and the swivel coupling members can be relatively swiveled and the tie rod members relatively pivoted about the transverse axis to locate the spout at a desired position located to one side of and below the discharge pipe. This enables ready discharge of waste water from the vehicle at any storage tank or the like located in the vicinity of the vehicle. During travel of the vehicle, a cabinet, mounted on the vehicle at a position spaced from the discharge pipe corresponding to the position of the discharge spout in the retracted position of the tube assembly, enables the telescoping drain assembly to be supported in a neat and enclosed manner on the vehicle.

The end result is a telescoping drain assembly that can be readily used by the recreational vehicle operator to dispose of liquid waste from the vehicle in a dignified manner approaching a "white glove" operation. In other words, the vehicle operator can conveniently avoid the usual mess associated with emptying liquid waste receptacles on the vehicle.

Further objects, features and advantages of the invention will be apparent from the accompanying description and the appended claims when taken in connection and the accompanying drawings in which:

FIG. 1 is a fragmentary perspective view illustrating a portion of a recreational vehicle and showing the telescoping drain assembly of this invention is assembly relation with the vehicle and in a position for discharging the liquid waste from the vehicle into an underground receptacle; and FIG. 2 is a perspective view of the telescoping drain assembly of this invention shown in assembly relation with a vehicle discharge pipe;

FIG. 3 is a longitudinal sectional view of the structure shown in FIG. 2 as viewed from substantially the line 3—3 in FIG. 2.

Figure 4:
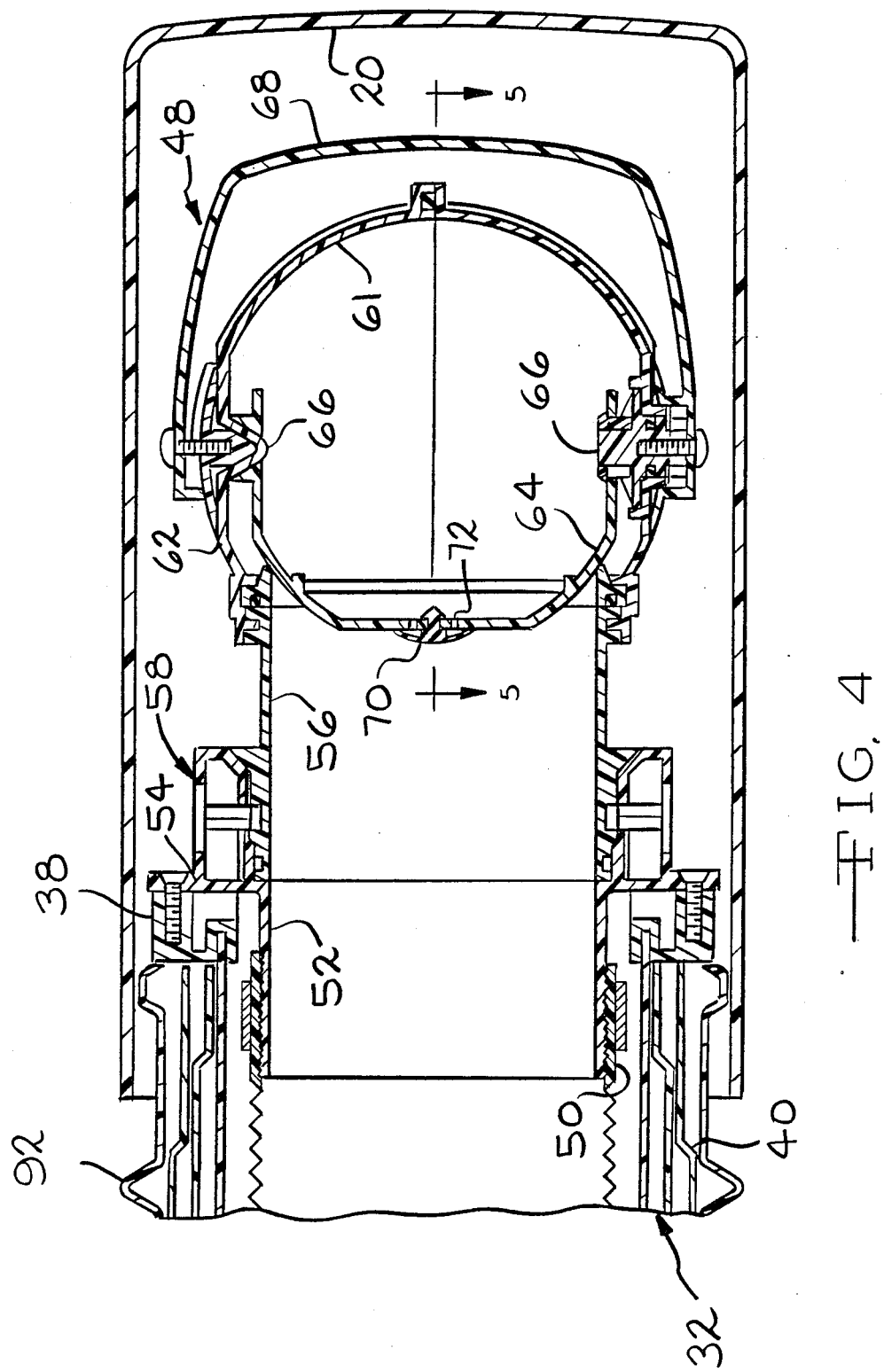
FIG. 4 is a fragmentary enlarged sectional view of one end portion of the telescoping drain assembly of this invention.

With reference to the drawing, the telescoping drain assembly of this invention, indicated generally at 10, is illustrated in FIG. 1 mounted on a recreational vehicle 12 of either van or trailer type containing conventional holding tank(s), not shown, for waste water and sewage and a discharge pipe 14 through which such fluid waste is directed. The telescoping drain assembly 10 is illustrated in FIG. 1 in an operating position in which it is capable of discharging fluid waste from the vehicle 12 into the inlet opening 16 for an underground disposal tank (not shown). The telescoping drain assembly 10 is also moveable to a storage position in which it is of a retracted length relative to the extended length shown in FIG. 1 and in which the discharge end of the drain assembly 10 is supported in a storage cabinet supported on a position below the vehicle 12. The cabinet 20 is shown in an open position in FIG. 1 and in a closed position shown in FIG. 2.

Figure 7:
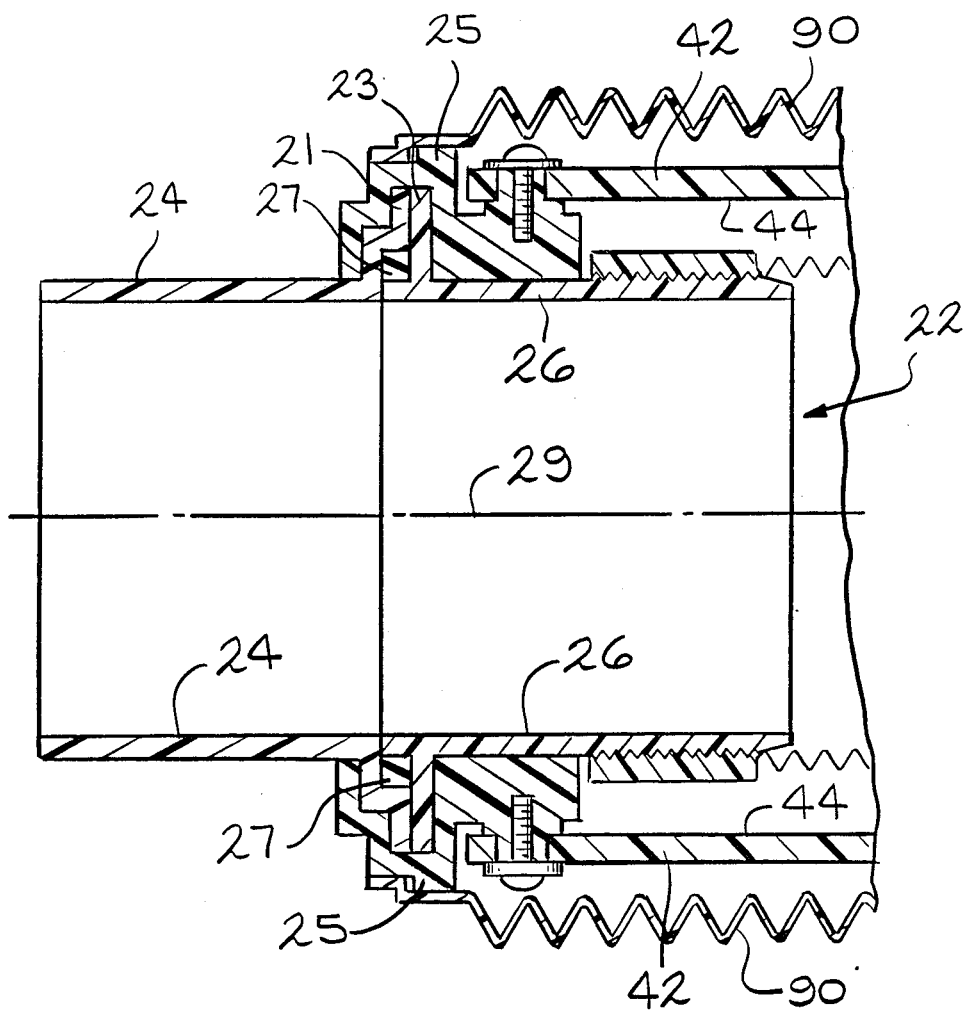
FIG. 7 is an enlarged sectional view of the swivel coupling unit shown in FIG. 3.

The telescoping drain assembly 10 includes a swivel coupling unit 22, shown sectionally in FIG. 3 and enlarged in FIG. 7, which is comprised of a pair of relatively rotatable aligned flanged tubular members 24 and 26 and a split ring retainer 25. Annular flanges 21 and 23 on one end of each of members 24 and 26 respectively are mated together and rotatably enclosed within the annular groove in retainer 25. Conventional o-ring 27 residing in the recess formed between mated flanges 21 and 23 provides a sealed flow path between tubular members 24 and 26 while allowing relative rotation of member 26 about axis 29. The opposite end of tubular member 24 is secured to inlet hose 15 which is in turn removably secured to discharge pipe 14 via outlet adapter 13. Inlet hose 15 is secured to the vehicle by bracket 17. The opposite end of tubular member 26 is fixed to end 30 of flow hose 28.

As shown in FIG. 3, the axially extensible flow hose 28 is secured at one end 30 to the tubular member 26. The flow hose 28, in addition to being axially extensible, is of a flexible construction so that it is also readily bendable in a transverse direction.

A telescoping support tube assembly 32, consisting of a plurality of axially aligned relatively telescoped tubes 34 is positioned about the flow hose 28 at a position spaced from the coupling unit 22. In the illustrated embodiment of the invention, the assembly consists of four tubes 34, the outer most tube 34 is secured to an annular bracket 36 and the inner most tube 34 is secured to an annular bracket 38. The ends of the tubes are formed with abutting shoulders 40 so that when the inner most tube 34 is moved in a direction axially away from the adjacent tube 34, when it has been moved its full length, the shoulder 40 thereon will abut with the corresponding shoulder 40 on the adjacent tube so as to in turn extend that tube 40 relative to its outwardly adjacent tube.

Two tie rod assemblies 42 are each pivotally connected to and extended between opposite sides of the retainer 25 as shown in FIG. 7, and the annular bracket 36 shown in FIG. 3. The tie rod assemblies 42 consist of a plurality of link arms 44 that are pivotally connected for relative pivotal movement about an axis 46 which extends transversely through the flow hose 28.

As shown in FIG. 3, a flexibly bendable conduit or accordion bellows tube 90 covers the flow hose 28 and tie rod assemblies 42 and is connected to one end to retainer 25 and at the other end extends over bracket 36 and is connected to the support assembly 32.

Figure 5:
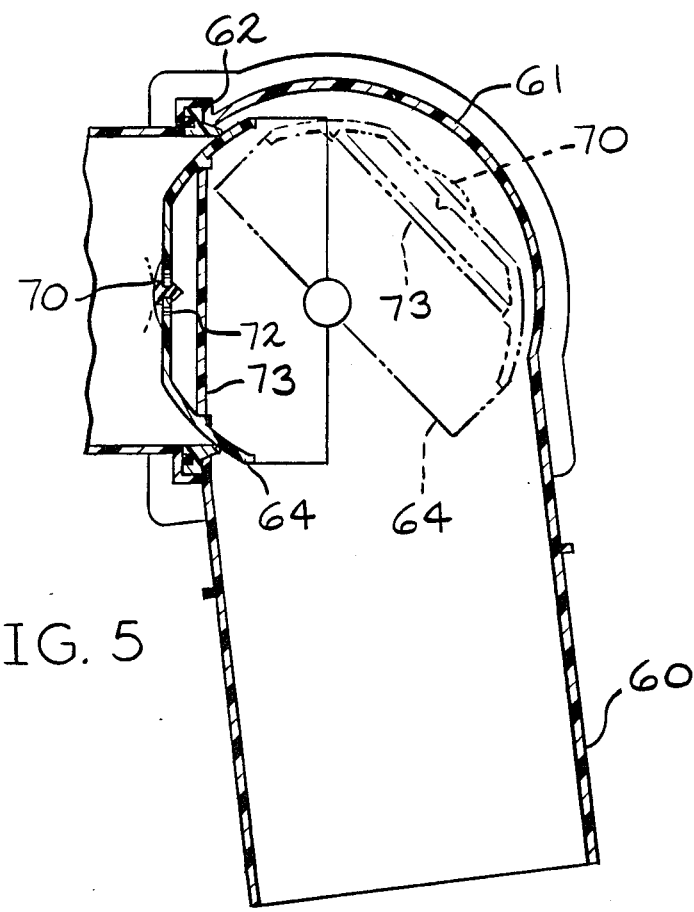
FIG. 5 is a transverse sectional view of a portion of the telescoping drain assembly that incorporates the discharge spout, as viewed from substantially line 5—5 in FIG. 4, showing the shut off valve in open and closed positions.

A discharge spout unit 48 is connected to the annular bracket 38 at the end of the telescoping tube assembly 32 remote from the coupling unit 22. The end 50 of the flow tube 28 is secured to a tubular member 52 which is in turn provided with an annular flange 54 that is secured to the bracket 38. The discharge spout unit 48 includes an inlet tube 56 which is removably connected by a conventional coupling unit 58 to the flange 54 so that the tubes 52 and 56 are in axial alignment. A tubular spout member 60 that extends at an angle to the tubular member 56 has a ball shaped head portion 61 having an integral coupling unit 62 that rotatably couples the tubular member 56 and spout 60 so that the spout 60 can be manipulated to locate it in a desired opening such as the inlet opening 16 for the underground storage tank. A shut off valve assembly 64 is rotatably mounted on transversely aligned pivot member 66 carried by the ball shaped head portion 61 of spout 60. The shut off valve 64 is moveable between the closed position to seal the end of tube 56 shown in solid lines in FIG. 5 and the open position shown in broken lines in FIG. 5. An external bail member 68 is connected to the shut off valve 64 at the pivot members 66 to provide for movement of the valve 64 between its open and closed positions in response to rotatable movement of the bail 68.

The shut off valve 64 includes a vent valve member 70 which normally covers vent openings such as those indicated at 72. However, in the event of a vacuum condition being created inside the flow tube 28 from the extension of the telescoping drain assembly 10 with shutoff valve 64 in the closed position, the vent valve member 70 will move outwardly, as shown in broken lines in FIG. 5 to enable air to vent through the openings 72. This facilitates a smooth operation of extending the telescoping drain assembly 10. A splash plate 73 prevents the plugging of the vent openings 72 from the splashing of waste flow.

The cabinet 20 is shaped to accommodate the discharge spout assembly 48. The cabinet 20 consists of a main enclosure body 76, of generally L-shape having a side opening 78 and a supporting bottom wall 80 on which the discharge spout assembly 48 rests in a storage position of the telescoping drain assembly 10. The cabinet 20 also includes a door member 82 pivotally mounted by a hinge 84 on the body 76 for movement between an open position to one side of the opening 78 (FIG. 1) and a closed position closing the opening 78 and releasably latched to the body 76 by a latch 88. Cabinet 20 is attached to the substructure of recreational vehicle 12 by means of a support bracket 19.

In the use of the telescoping drain apparatus 10 of this invention, assume that the vehicle 12 is parked and it is desired to empty the liquid waste in the holding tank or tanks in the vehicle 12 through the discharge pipe 14 into the underground tank having the inlet opening 16. Further assume that at such time the assembly 10 is in its storage position shown in FIG. 3 in which it is located below the body of the vehicle 12.

Figure 6:
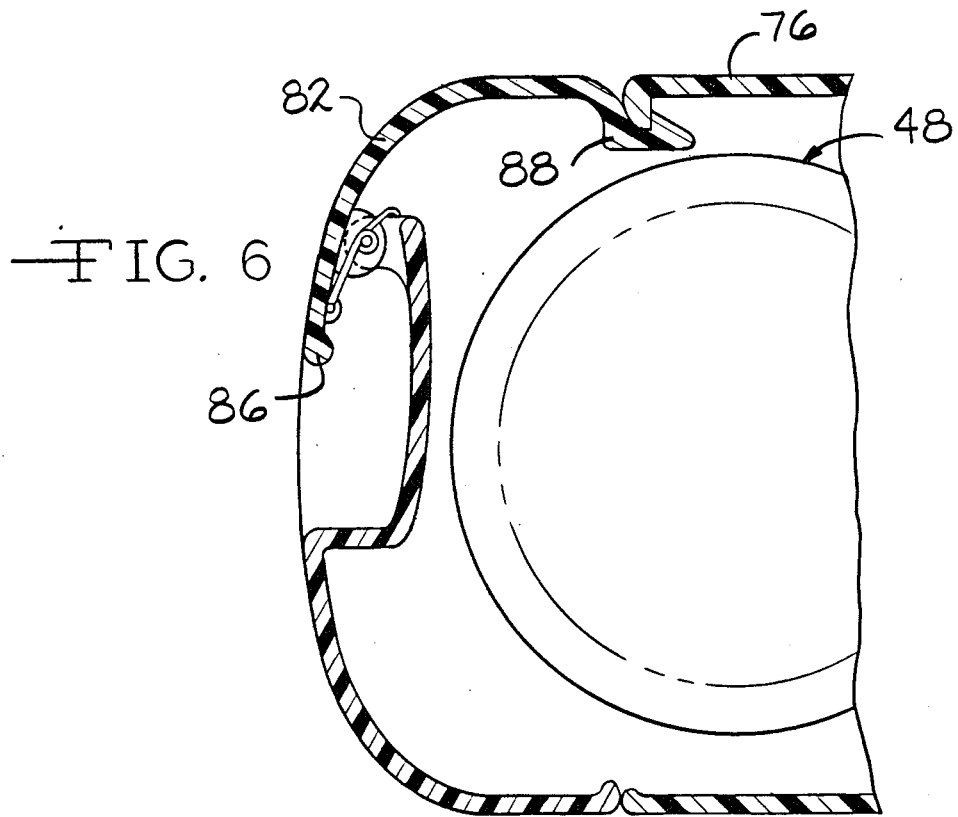
FIG. 6 is an enlarged transverse sectional view of a portion of the storage cabinet as viewed from substantially the line 6—6 in FIG. 2.

The handle opening 86 (FIG. 6) on the enclosure cover 20 is grasped and the cover 20 is manipulated to release the latch 88 following which the cover 82 is moved to its open position shown in FIG. 1. The discharge spout unit 48 is then manually grasped and moved horizontally out of the enclosure 46 with the vent valve member 70 breaking any vacuum inside flow tube 28 and the spout 60 is rotated to a substantially downwardly extending position. The spout 60 can then readily be moved to a position aligned with the tank opening 16 by virtue of the fact that the telescoping tube assembly 32 enables extension of the drain assembly 10 to a desired length and the bellows 90 along with the tie rod assemblies 42 cooperate with the coupling unit 22 to enable universal movement of the spout 60 both rotatably and pivotally to the necessary position. The bail 68 is then readily moved to position the shut off valve member 64 in its open position shown in broken lines in FIG. 5. Waste material can then flow continuously from the discharge pipe 14 through the discharge spout 60.

When emptying of the liquid waste from the vehicle 12 has been completed, the discharge spout assembly 48 is manually manipulated to return it to its position supported on the bottom wall 78 of the enclosure 76. During such movement, the telescoping tube assembly 32 is retracted to shorten the effective length of the assembly 10 and enable the discharge spout 48 to be readily moved through the enclosure opening 78.

The result is a preconnected and enclosed assembly in which the liquid waste that is being handled is positively prevented from contact with the exterior of the telescoping drain assembly 10 at all times. As a result, the liquid waste can be emptied from the vehicle 12 in a relatively clean operation in which the operator does not have to be concerned with the inconvenient connecting or disconnecting of any waste removal mechanisms, or the unsanitary results of coming in contact with the liquid waste. Such a result is desirable and advantageous and facilitates desired use of the recreational vehicle 12.

What is claimed is:

1. In combination with a recreational vehicle having a discharge pipe for liquid waste, a telescoping drain assembly which is attached to said vehicle for transporting liquid waste from said discharge pipe to a discharge location spaced from said vehicle, said telescoping drain assembly comprising a swivel coupling unit coupled to said discharge pipe for rotation about an axis in the direction of waste discharge through said coupling unit, an axially extensible flow hose of flexible construction connected at one end to said coupling, an extensible and retractable telescoping tube assembly positioned about said flow hose at a position spaced from said coupling unit, and link means connected to and extending between one end of said tube assembly and said coupling assembly enabling pivotal movement of said tube assembly and said flow hose about an axis extending transversely of said axis through said coupling unit, a discharge spout unit connected to the other end of said flow hose and to the other end of said telescoping tube assembly, whereby telescoping tube assembly can be relatively telescoped to locate said spout a desired distance from said vehicle, and said swivel coupling members can be relatively swiveled about the axis through said coupling unit and said tube assembly pivoted about said transverse axis to locate said spout at a desired position located to one side of and below said discharge pipe.

2. The telescoping drain assembly according to claim 1 further including a cabinet adapted to be mounted on said vehicle at a position spaced from said discharge pipe corresponding to the position of said discharge spout in the retracted position of said tube assembly, said cabinet being usable to enclose said discharge spout unit in a storage position of said telescoping drain assembly in which said telescoping tube assembly is retracted.

3. The telescoping drain assembly according to claim 1 further including a shut off valve member in said discharge spout unit movable between open and closed positions.

4. The telescoping drain assembly according to claim 3 further including an external bail member pivotally mounted on said spout unit and connected to said shut off valve member so that pivotal movement of said bail member is operable to move said valve member between said open and closed positions.

5. The telescoping drain assembly according to claim 3 further including means forming a vent opening in said shut off valve member operable to vent said telescoping drain assembly through said discharge spout to atmosphere when said drain assembly is extended to prevent drawing a vacuum in said assembly which would preclude extension of said assembly.

6. The telescoping drain according to claim 4 further including a splash plate in said shut off valve in front of said vent opening to prevent plugging of said vent opening by the splashing of waste flow toward said opening when said valve is open.

7. In combination with a recreational vehicle having a discharge pipe for liquid waste, a telescoping drain assembly movable between a storage position and an operating position for transporting liquid waste from said discharge pipe to a discharge location spaced from said vehicle, said telescoping drain assembly comprising a swivel coupling unit comprising a pair of relatively rotatable aligned tubular members rotatable about an axis in the direction of waste discharge through said coupling unit, one of which members is connected to said discharge pipe, an axially extensible flow hose of flexible construction connected to one end of the other one of said tubular members, a telescoping tube assembly having a pair of ends and comprising a plurality of axially telescoped tubes positioned about said flow hose at a position spaced from said coupling unit, a tie rod assembly connected to and extending between one end of said tube assembly and said coupling unit, said tie rod assembly comprising tie rod members pivotally connected for pivotal movement about an axis extending transversely through said flow hose at a location spaced from said coupling unit, a discharge spout unit connected to the other end of said telescoping tube assembly, and a valve member in said discharge spout unit movable between open and closed positions, whereby said telescoping tube assembly can be relatively telescoped to locate said spout a desired distance from said vehicle and said swivel coupling members can be relatively swiveled and said tie rod members relatively pivoted about said transverse axis to locate said spout at a desired position located to one side of and below said discharge pipe.

8. The telescoping drain assembly according to claim 7 further including a cabinet adapted to be mounted on said vehicle at a position spaced from said discharge pipe corresponding to the position of said discharge spout in the retracted position of said tube assembly, said cabinet being usable to enclose said discharge spout unit in the storage position of said telescoping drain assembly.

9. The telescoping drain assembly according to claim 8 wherein said cabinet includes a main enclosure body having a side opening and a supporting bottom wall on which said discharge spout can rest, and a door member hingedly mounted on said body for movement between an open position to one side of said side opening and a closed position closing said opening and releasably latched to said body.

10. The telescoping drain assembly according to claim 7 further including a flexibly bendable and longitudinally extensible conduit member enclosing said tie rod assembly and a longitudinally flexible cover member enclosing said telescoping tube assembly.

* * * * *